UNITED STATES PATENT OFFICE 2,173,417

AZO DYESTUFFS AND PROCESS OF MAKING SAME

Wilhelm Huber, Basel, Switzerland, assignor to Society of Chemical Industry in Basle, Basel, Switzerland No Drawing. Application February 23, 1935, Serial No. 7,907. In Switzerland February 23, 1934

29 Claims. (Cl. 260—198)

This invention relates to the manufacture of valuable azo-dyestuffs by diazotizing amino-compounds of the general formula

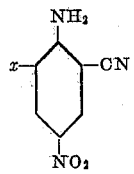

in which $x$ stands for a hydrogen atom or a nitro-group, and uniting the diazo-compounds thus obtained with coupling components of the general formula

in which A stands for a nucleus of the benzene or naphthalene series which may or may not be substituted, and $R_1$ and $R_2$ stand for hydrogen, alkyl, aryl or aralkyl radicals, the conditions of coupling being chosen in such a manner that the

group is the group which causes coupling.

The term "alkyl radicals" comprises not only the radicals of hydrocarbons, such as methyl, ethyl, propyl or butyl radicals, and the like, but also, as used in the scientific literature, cf. "Anthracene and Anthraquinone" by E. de Barry Barnett, London 1921, page 207, and in the patent literature cf. British Patent 26,336/1910 claim 1, substituted alkyl radicals, for example alkyl radicals substituted by halogen, such as, for example, chloro-, bromo- or iodo-ethyl radicals, alkyl radicals substituted by OH-groups, such as hydroxyethyl-, hydroxypropyl-, hydroxybutyl- or dihydroxypropylene radicals, further the ethers and esters thereof, such as methoxyethyl- or acetoxyethyl- or ethylsulfuric acid radicals, further also alkylcarboxylic acid radicals and their derivatives, such as propionic acid radicals or propionic ester radicals or propionic acid amide radicals, or the radicals of ethylnitrile or ethylsulfocyanide. The aryl- or aralkyl-radicals $R_1$ and $R_2$ may also be substituted in the aromatic nucleus.

Diazotizing components falling under the general formula mentioned above are the 2-cyano-4-nitro-1-aminobenzene and the 2-cyano-4,6-dinitro-1-aminobenzene.

As coupling components of the general formula

also explained above, there are suitable any bases of the benzene or naphthalene series capable of coupling, such as aniline and the α- and β-naphthylamine, as well as the homologues, analogues and N-substitution products of these three parent substances, for example meta-toluidine, meta-aminophenol, para-xylidine, 1-amino-2-methoxy-5-methylbenzene of the formula

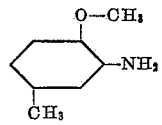

particularly, for example, N-methoxyethylamino-benzene of the formula

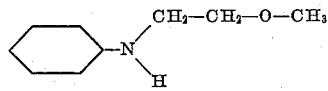

N-ethyl-N-methoxyethylaminobenzene of the formula

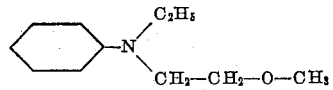

ω-bromoethyl-ethylaminobenzene of the formula

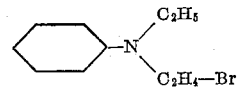

ω-ethyl-cyanide-ethylaminobenzene of the formula

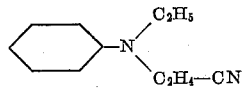

ω-thiocyanogen-ethyl-ethylaminobenzene of the formula

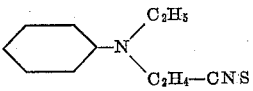

ω-sulfatoethyl-ethylaminobenzene of the formula

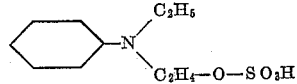

1-(N-ethyl-N-methoxyethyl)-amino - 3 - methyl-benzene, 2 - methoxy-5-methyl-1-N-(methoxyethyl)-aminobenzene, 2-methoxy-5-methyl-1-(N-ethyl-N-methoxyethyl)-aminobenzene, 2 - methoxy - 5 - methyl - 1 -(N-butyl-N-methoxyethyl) - aminobenzene, 2 - methoxy - 5 - methyl-1-N-(dimethoxyethyl)-aminobenzene of the formula

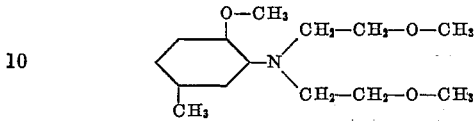

2 - methoxy - 5 - methyl - N - (di-ω-aminoethyl) - aminobenzene, 2,5 - dimethoxy - 1 - N-(methoxyethyl)-aminobenzene, 2,5 - dimethoxy-1-N-(di - methoxyethyl)-aminobenzene, N-ethyl - N - hydroxyethylaminobenzene, N-butyl - N - hydroxyethylaminobenzene, 3-methyl-1-(N-ethyl-N-hydroxyethyl) - aminobenzene, 3 - methyl - 1 - (N-butyl-N-hydroxyethyl)-aminobenzene, 2-methoxy-5-methyl-1-N-hydroxyethylaminobenzene, 2-methoxy-5-methyl-1-(N-ethyl-N-hydroxyethyl) - aminobenzene, 2-methoxy-5-methyl-1-(N-methoxyethyl - N - hydroxyethyl) - aminobenzene, 2-methoxy-5-methyl-1-(N-butyl-N-hydroxyethyl)-aminobenzene, 2-methoxy-5-methyl-1-N-(di-β-hydroxyethyl)-aminobenzene, 2,5-dimethoxy-1-N-hydroxyethyl-aminobenzene, 2,5-dimethoxy-1-(N -ethyl-N-hydroxyethyl)- aminobenzene, 2,5-dimethoxy-1-(N-methoxyethyl-N-hydroxyethyl)-aminobenzene, 2,5-dimethoxy - 1 - N - (di-β-hydroxyethyl) - aminobenzene, N-ethyl-N-acetoxyethylaminobenzene of the formula

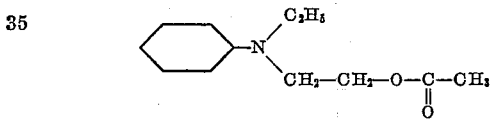

2 - methoxy -5- methyl -1- N - (diacetoxyethyl)-aminobenzene, 2-methoxy-5-methyl-1-(N - ethyl-N-acetoxyethyl) -aminobenzene, 2,5 - dimethoxy-1 -(N-ethyl-N-acetoxyethyl) - aminobenzene, 2,5-dimethoxy-1-(N-diacetoxyethyl) - aminobenzene, 2-methoxy-5-methyl-1-N-(methoxyethyl-β-γ-dihydroxypropyl) - aminobenzene, 2 - methoxy - 5 - methyl-1-N-(hydroxyethyl - β - γ - dihydroxypropyl)-aminobenzene, 2-methoxy-5- methyl- 1 - N - (hydroxyethyl - γ - ethoxy - β - hydroxypropyl) - aminobenzene, 2-methoxy-5-methyl - 1 - N - (hydroxyethyl-γ-methoxy-β-hydroxypropyl)-aminobenzene, 2 - methoxy- 5- methyl - 1 - N - (butyl-γ-ethoxy - β - hydroxypropyl) - aminobenzene, 2 - methoxy-5-methyl- 1 -N-(butyl-γ-methoxy-β-hydroxypropyl)-aminobenzene, 2,5-dimethoxy-1-N-(methoxyethyl-β-γ-dihydroxypropyl)-aminobenzene, 2,5-dimethoxy-1-N-(hydroxyethyl -β-γ - dihydroxypropyl)-aminobenzene, 2,5-dimethoxy-1-N-(hydroxyethyl -γ-ethoxy - β - hydroxypropyl) - aminobenzene, 2,5 - dimethoxy - 1 - N - (hydroxyethyl-γ-methoxy-β - hydroxypropyl) - aminobenzene, 2,5-dimethoxy-1-N-(butyl-γ-ethoxy - β -hydroxypropyl)-aminobenzene, 2,5-dimethoxy-1-N-(butyl-γ-methoxyethyl-β-hydroxypropyl)-aminobenzene, N-(γ-methoxy - β - hydroxypropyl) - n - butylaminobenzene, 3-methyl-1-N-(γ-methoxy-β-hydroxypropyl) - n - butylaminobenzene, N - (γ - ethoxy-β-hydroxypropyl) -n- butylaminobenzene, 3-methyl- 1 - N - (γ-ethoxy-β-hydroxypropyl)-n-butylaminobenzene, N - (di - β - hydroxyethyl) - aminobenzene, 3-methyl-1-N -(di-β-hydroxyethyl)-aminobenzene, 3-chloro-1-N-(di-β-hydroxyethyl)-aminobenzene, N - (di -β-γ-dihydroxypropyl)-aminobenzene, 3 - chloro-5- methoxy- 1 -N-(di-β-hydroxyethyl)-aminobenzene and the like.

1 - amino-2-methoxynaphthalene or 1 - amino-2-ethoxynaphthalene such as

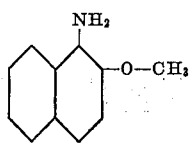

N-methyl-α-naphthylamine, N - ethyl - α - naphthylamine, N-methyl-β-naphthylamine, N-ethyl-β-naphthylamine, the so-called ω-methane-sulfonic acids of α - and β - naphthylamine, 1 - N - methoxyethylaminonaphthalene of the formula

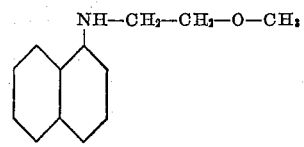

2-N -methoxyethylaminonaphthalene, 1 - N - hydroxyethylaminonaphthalene, 2-N-hydroxyethyl-aminonaphthalene, further aminonaphthols such as, for example, 1-amino-5-hydroxynaphthalene, 1-amino-6-hydroxynaphthalene, 1 - amino-7-hydroxynaphthalene, 1 - amino-8-hydroxynaphthalene, 2-amino-3-hydroxynaphthalene, 2 - amino-4-hydroxynaphthalene, 2-amino-5-hydroxynaphthalene, 2 - amino - 6 - hydroxynaphthalene, 2 - amino-7-hydroxynaphthalene, 2 - amino - 8 - hydroxynaphthalene, further the corresponding alkylamino-hydroxynaphthalenes such as, for example, 1-methylamino-5-hydroxynaphthalene, 1-hydroxyethylamino- 5 - hydroxynaphthalene and the like, also sulfonic acids of these compounds, this term including true sulfonic acids and also ester sulfonic acids.

If the coupling component of the general formula

contains no phenolic OH-group in the aromatic nucleus A of the benzene or naphthalene series, the expression "coupling conditions in which the amino group

causes coupling" means the coupling of the component in neutral or acid medium usual for aromatic amines. However, if the aromatic nucleus A contains one or more phenolic OH-groups, only coupling in acid medium comes into consideration. But, as is well known, the selection of the coupling conditions in such a manner that the amino group of a coupling component is the group which causes coupling does not present a problem to the expert, but a known step.

If desired, the dyestuffs obtainable can still be acylated or alkylated.

The new dyestuffs correspond therefore to the general formula

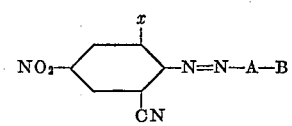

in which $x$ stands for hydrogen or a nitro-group, A for an aromatic nucleus of the benzene or naphthalene series and B for an amino group standing in 4-position to the —N=N—group.

The dyestuffs thus obtained are red to green powders, which are excellently suitable for dyeing textiles of various kinds, for example wool, silk, artificial silk, cellulose, particularly esters and ethers thereof, for example acetylcellulose and other conversion products of cellulose, such as nitrocellulose etc. They can also be used as intermediate products for the manufacture of further dyestuffs. Whereas the sulfonated dyestuffs are particularly valuable for dyeing and printing wool and for printing acetate artificial silk, the non-sulfonated dyestuffs, when brought into suitable form or suspended in a suitable medium, have a pronounced affinity for cellulose esters and ethers, particularly acetate artificial silk. Besides dyestuffs which dye red, violet and brown tints there can, by a suitable choice of the coupling components be obtained dyestuffs which have the valuable property to dye acetate artificial silk blue tints capable of discharge and characterized by their greenish cast. Quite generally it may be said that among the new dyestuffs the unsulfonated dyestuffs are more valuable and among these, if the aromatic radical A is a radical of the benzene series, those dyestuffs in which the radical of the benzene series does not contain a phenolic OH-group, and in which the amino group causing coupling is substituted twice by alkyl radicals. Consequently, the new dyestuffs correspond to the general formula

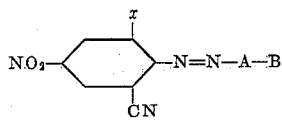

in which $x$ stands for a hydrogen atom or a nitro group, and B represents an amino group standing in 4-position to the —N=N—group and substituted by two alkyl radicals. These products are dark powders insoluble in water, but dissolving in acetic ester to red to blue solutions and dyeing acetate artificial silk red to blue tints of good fastness. Among these products those are again particularly valuable in which at least one of the two 2,5-positions of the benzene radical A is substituted by at least one alkyl or alkoxy group.

If the aromatic radical A belongs to the naphthalene series, those dyestuffs are particularly valuable in which the naphthalene radical still carries an aromatically bound OH-group besides the amino group causing coupling. Among these products those are then again particularly valuable which correspond to the general formula

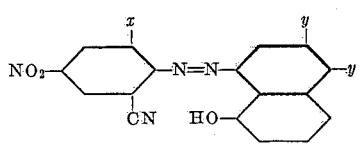

in which one $y$ stands for an NH$_2$-group and the other $y$ for a hydrogen atom, which products are dark powders insoluble in water, but dissolving in acetic ester to violet to blue and green solutions, and dyeing acetate artificial silk from suspension dye-baths violet to blue and green tints.

The non-sulfonated dyestuffs, which are sparingly soluble in water, are used for dyeing acetate artificial silk, preferably in finely dispersed form produced by grinding them with dispersing agents, for instance the sulfonated residues from the manufacture of benzaldehyde or turpentine oil and the like, in the presence of water until a fine paste is produced; or they may be converted in the presence of further quantities of the aforesaid or other auxiliary substances, such as sulfite cellulose waste liquor, by cautiously drying them in a vacuum at a temperature which is not too high, into dry preparations capable of being powdered.

The following examples illustrate the invention, the parts being by weight:

*Example 1*

16.3 parts of 2-cyano-4-nitro-1-aminobenzene are introduced, while stirring vigorously and cooling, into a solution of nitrosylsulfuric acid prepared from about 70 parts of concentrated sulfuric acid and 7 parts of sodium nitrite. Stirring is continued until a sample of the mixture is clearly soluble in ice-water. The solution is then poured into much ice and water. The clear diazo solution obtained, which has been partly neutralized by addition of sodium hydroxide solution, is mixed with a solution of 17.9 parts of (N-ethyl-N-methoxyethyl)-aminobenzene in the necessary quantity of dilute mineral acid. The dyestuff separates in the form of a dark powder. After the coupling has been finished by addition of sodium acetate, the dyestuff is filtered and washed until neutral.

When dry, the dyestuff thus obtained of the formula

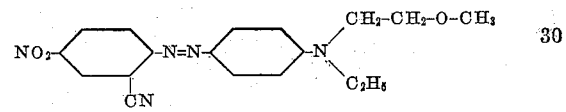

forms a dark powder dissolving in organic solvents, such as acetone, acetic ester and the like to a red-violet solution. When brought into a state of fine dispersion by suitable additions it dyes acetate artificial silk pure red-violet tints.

*Example 2*

A diazo-solution made as described above from 16.3 parts of 2-cyano-4-nitro-1-aminobenzene is mixed with a solution of 19.6 parts of 2-methoxy-5-methyl-1-N-(di-methoxyethyl)-aminobenzene in dilute mineral acid. The coupling is finished by the addition of sodium acetate. The dyestuff thus obtained of the formula

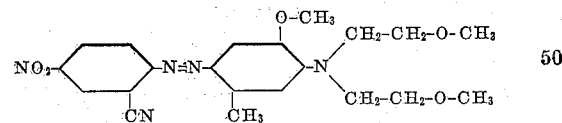

forms a dark powder, dissolving in acetone, acetic ester and the like to a violet solution. When brought into fine dispersion it dyes acetate artificial silk violet tints.

*Example 3*

A diazo-solution made from 16.3 parts of 2-cyano-4-nitro-1-aminobenzene is mixed with a solution of 20.7 parts of 3-methyl-1-(N-butyl-N-hydroxyethyl)-aminobenzene in dilute mineral acid. The coupling is finished by the addition of sodium acetate. The dyestuff thus obtained of the formula

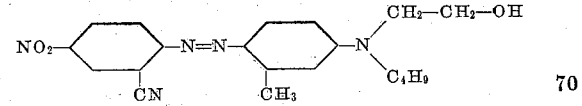

forms a dark powder dissolving in acetone, acetic ester and the like to a red-violet solution. When brought into fine dispersion it dyes acetate artificial silk violet tints.

Example 4

20.8 parts of 6-cyano-2,4-dinitro-1-aminobenzene (obtainable for example in known manner by nitrating 2-methoxy-1-benzoic acid-nitrile or 2-methoxy-5-nitro-1-benzonitrile to produce the 1-methoxy-6-cyano-2,4-dinitrobenzene and exchange of the methoxy-group for the NH₂-group with aid of a solution of ammonia in methyl alcohol) are introduced, while stirring vigorously, into 100 parts of concentrated sulfuric acid in such a manner that the rise of temperature is not considerable. Stirring is continued until dissolution is complete. The solution thus obtained is cooled to about 0° C. and mixed with a solution of nitrosylsulfuric acid made from 7 parts of sodium nitrite and about 70 parts of sulfuric acid in known manner. The mixture, which, if necessary, has been heated for some time to 40° C. for completing dissolution and thoroughly diazotizing the base, if desired in the presence of a stabilizer, is now introduced, with vigorous stirring, into a solution, mixed with much ground ice, of 25.3 parts of 2-methoxy-5-methyl-1-N-(dimethoxyethyl)-aminobenzene in the necessary quantity of dilute mineral acid at 0° C. The formation of dyestuff is completed in a short time. The dyestuff of the formula

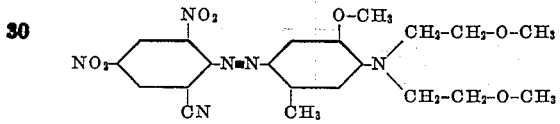

is filtered and washed until neutral and may be crystallized from alcohol. When dry it is a dark powder, soluble in organic solvents, such as acetic ester, acetone, alcohol or ether, to blue solutions. When brought into a state of fine dispersion by suitable additions it dyes acetate artificial silk pure blue tints.

If instead of 2-methoxy-5-methyl-1-N-(dimethoxyethyl)-aminobenzene there is used, for example, the corresponding quantity of 2-methoxy-5-methyl-1-(N-butyl-N-methoxyethyl)-aminobenzene, there is obtained a dyestuff which dyes acetate artificial silk greenish-blue tints.

Example 5

A diazo-solution, made from 20.8 parts of 6-cyano-2,4-dinitro-1-aminobenzene as described above, is mixed in presence of much ground ice with a solution of 26.9 parts of 2,5-dimethoxy-1-N-(di-methoxyethyl)-aminobenzene in the necessary quantity of dilute mineral acid. The dyestuff of the formula

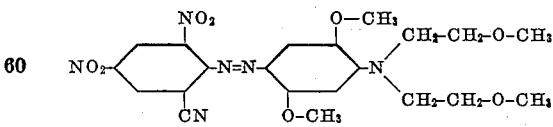

isolated in the usual manner, if necessary recrystallized from alcohol, and brought into a suitable state of fine dispersion, dyes acetate artificial silk vivid blue tints. When dry, it is a dark powder which dissolves in acetic ester to a blue solution.

Example 6

A diazo solution, made from 20.8 parts of 6-cyano-2,4-dinitro-1-aminobenzene, is mixed in presence of much ground ice with a solution of 23.9 parts of 2-methoxy-5-methyl-1-(N-hydroxyethyl-N-methoxyethyl)-aminobenzene in dilute mineral acid. When dry the dyestuff thus obtained of the formula

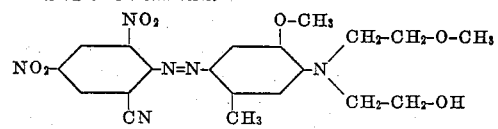

if necessary recrystallized from alcohol, forms a dark powder which dissolves in organic solvents such as alcohol, acetic ester and the like to a blue solution. When suitably dispersed it dyes acetate artificial silk blue tints.

Example 7

A diazo-soluttion, made from 20.8 parts of 6-cyano-2,4-dinitro-1-aminobenzene, is mixed in presence of much finely ground ice, while thoroughly stirring, with a solution of 20.7 parts of 3-methyl-1-(N-butyl-N-hydroxyethyl)-aminobenzene in dilute mineral acid. When dry, the dyestuff thus obtained of the formula

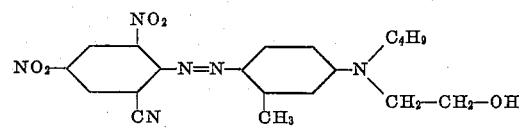

if necessary recrystallized from alcohol, forms a dark powder which, when suitably brought into a fine dispersion, dyes acetate artificial silk navy blue tints. In organic solvents, such as, for example alcohol or acetic ester, the dyestuff dissolves to a blue solution.

The procedure is similar with the other coupling components of the benzene series cited in the introduction, there being obtained further dyestuffs having similar properties.

Example 8

A diazo-solution, made from 16.3 parts of 2-cyano-4-nitro-1-aminobenzene as described above, is mixed with a solution of 15.9 parts of 1-amino-5-hydroxynaphthalene in dilute hydrochloric acid. The dyestuff of the formula

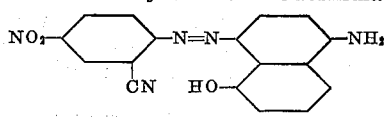

which precipitates in the form of a dark blue powder is filtered and washed until neutral. When dry, it forms a dark powder which dissolves in organic solvents, such as acetic ester, acetone and the like to a greenish-blue solution. When suitably dispersed it dyes acetate artificial silk brilliant greenish-blue tints.

Dyestuffs dyeing green tints are also obtained when substituting 2-cyano-4,6-dinitro-1-aminobenzene for the 2-cyano-4-nitro-1-aminobenzene or 1-methylamino-5-hydroxynaphthalene for the 1-amino-5-hydroxynaphthalene.

Example 9

A diazo-solution, made from 16.3 parts of 2-cyano-4-nitro-1-aminobenzene as described above, is added to a neutral solution of 23.9 parts of 2-amino-8-hydroxynaphthalene-6-sulfonic acid and, if desired, the reaction accelerated by addition of sodium acetate. The dyestuff of the formula

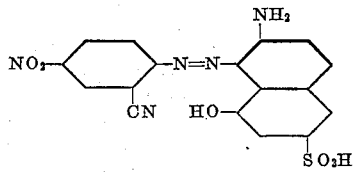

is filtered and washed out with a sodium chloride solution. It forms a dark powder which dyes wool from an acid bath violet tints.

When replacing the 2-amino-8-hydroxynaphthalene-6-sulfonic acid by the N-alkylated or N-arylated derivatives thereof, there are obtained dyestuffs which dye wool still bluer tints.

*Example 10*

10 parts of the dyestuff of Example 4 are made into a uniform paste containing 20 per cent of dyestuff while adding a suitable dispersing substance, such as Turkey red oil, sulfite cellulose waste liquor or sulfonation products of the residues from the benzaldehyde manufacture. A portion of this paste is intimately mixed with 10 parts of water of 50° C. and so many parts of a concentrated soap solution that the dye-bath to be produced therefrom corresponds to a soap solution of 0.2 per cent. strength. The whole is then diluted with cold water to about 300 parts. 10 parts of acetate artificial silk yarn are introduced into the emulsion thus prepared and moved therein, the dye-bath heated to 80–85° C. in the course of ¾ hour, and dyeing continued at this temperature for about ¼ hour. The yarn is then rinsed and brightened in the usual manner. There are obtained vivid, brilliant blue dyeings.

In the appended claims, the expression "alkyl" is intended to have the meaning set forth in the second paragraph of this specification.

What I claim is:

1. The process for the manufacture of azo-dyestuffs, comprising diazotizing an amino-compound of the general formula

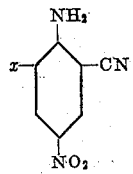

wherein $x$ represents a member of the group consisting of hydrogen and nitro, and uniting the resultant diazo-compound with an amino compound capable of coupling and corresponding to the general formula

wherein A represents a member of the group consisting of aromatic nuclei of the benzene and naphthalene series, and $R_1$ and $R_2$ represent a member of the group consisting of hydrogen and alkyl.

2. The process for the manufacture of azo-dyestuffs, comprising diazotizing an amino-compound of the general formula.

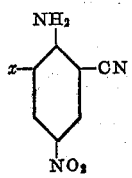

wherein $x$ represents a member of the group consisting of hydrogen and nitro, and uniting the resultant diazo-compound with an amino compound capable of coupling and corresponding to the general formula

wherein A represents an aromatic nucleus of the benzene series, and $R_1$ and $R_2$ represent a member of the group consisting of hydrogen and alkyl.

3. The process of producing azo dyestuffs which comprises coupling diazotized 1-amino-6-cyano-2,4-dinitrobenzene with an amino compound corresponding to the general formula

wherein A represents a nucleus of the benzene series, and $R_1$ and $R_2$ represent a member of the group consisting of hydrogen and alkyl.

4. The process of producing azo dyestuffs which comprises coupling diazotized 1-amino-6-cyano-2,4-dinitrobenzene with an amino compound corresponding to the general formula

wherein A represents a nucleus of the benzene series which carries a methyl group in meta position to the

group, and where $R_1$ and $R_2$ represent a member of the group consisting of hydrogen and alkyl.

5. The process of producing azo dyestuffs which comprises coupling diazotized 1-amino-6-cyano-2,4-dinitrobenzene with an amino compound corresponding to the general formula

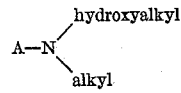

wherein A represents a nucleus of the benzene series which carries a methyl group in meta position to the

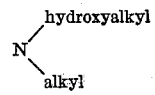

group.

6. The process of producing azo dyestuffs which comprises coupling diazotized 1-amino-6-cyano-2,4-dinitrobenzene with an amino compound corresponding to the general formula

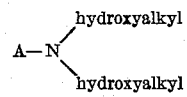

wherein A represents a nucleus of the benzene series which carries a methyl group in meta position to the

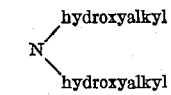

group.

7. Process for the manufacture of an azo-dyestuff, consisting in diazotizing the amino-compound of the formula

and uniting the diazo-compound thus obtained with the amine of the formula

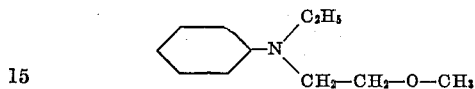

8. Process for the manufacture of an azo-dyestuff, consisting in diazotizing the amino-compound of the formula

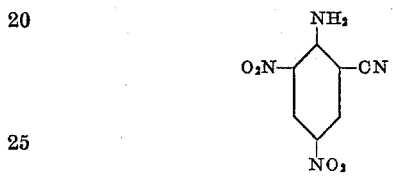

and uniting the diazo-compound thus obtained with the amine of the formula

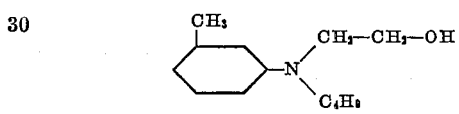

9. The process for the manufacture of azo-dyestuffs, comprising diazotizing an amino-compound of the general formula

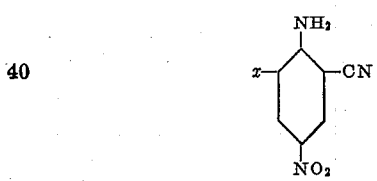

wherein $x$ represents a member of the group consisting of hydrogen and nitro, and uniting the resultant diazo-compound with an amino compound capable of coupling and corresponding to the general formula

wherein A represents an aromatic nucleus of the naphthalene series, and $R_1$ and $R_2$ each represents a member of the group consisting of hydrogen and alkyl.

10. Process for the manufacture of azo-dyestuffs, consisting in diazotizing amino-compounds of the general formula

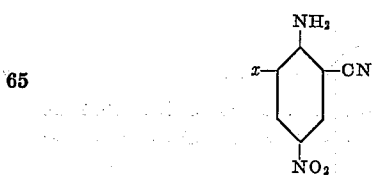

in which $x$ stands for a member of the group consisting of a hydrogen atom and a nitro-group, and uniting the diazo-compounds thus obtained with mono-amino-monohydroxynaphthalenes, the coupling being carried out in an acid medium.

11. Process for the manufacture of azo-dyestuffs, consisting in diazotizing amino-compounds of the general formula

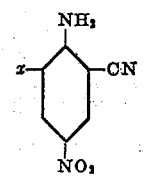

in which $x$ stands for a member of the group consisting of a hydrogen atom and a nitro-group, and uniting the diazo-compounds thus obtained with amino-naphthols of the general formula

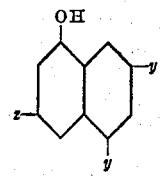

in which one $y$ stands for an $NH_2$-group, the other $y$ for a hydrogen atom, and $z$ for a member of the group consisting of a sulfo-group and a hydrogen atom, the coupling being carried out in an acid medium.

12. Process for the manufacture of azo-dyestuffs, consisting in diazotizing amino-compounds of the general formula

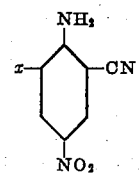

in which $x$ stands for a member of the group consisting of a hydrogen atom and a nitro-group, and uniting the diazo-compounds thus obtained with unsulfonated amino-naphthols of the general formula

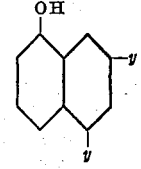

in which one $y$ stands for an $NH_2$-group and the other $y$ for a hydrogen atom, the coupling being carried out in an acid medium.

13. Process for the manufacture of azo-dyestuffs, consisting in diazotizing the amino-compound of the formula

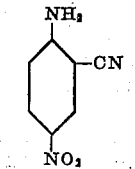

and coupling the diazo-compound thus obtained with unsulfonated amino-naphthols of the general formula

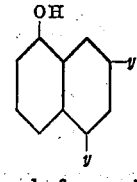

in which one $y$ stands for an $NH_2$-group and the other $y$ for a hydrogen atom, the coupling being carried out in an acid medium.

14. Process for the manufacture of an azo-dyestuff, consisting in diazotizing the amino-compound of the formula

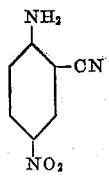

and coupling the diazo-compound thus obtained with the 1,5-amino-naphthol, the coupling being carried out in an acid medium.

15. The azo-dyestuffs of the general formula

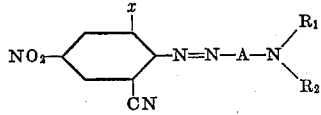

wherein $x$ represents a member of the group consisting of hydrogen and nitro, A represents a member of the group consisting of aromatic nuclei of the benzene and naphthalene series, and $R_1$ and $R_2$ represent a member of the group consisting of hydrogen and alkyl, the amino group

standing in 4-position to the —N=N— group when A is a nucleus of the benzene series and in ortho or para position to the —N=N— group when A is a nucleus of the naphthalene series.

16. The azo dyestuffs prepared from 1-amino-6-cyano-2,4-dinitrobenzene and an amino compound corresponding to the general formula

wherein A represents a nucleus of the benzene series and $R_1$ and $R_2$ represent a member of the group consisting of hydrogen and alkyl.

17. The azo dyestuffs prepared from 1-amino-6-cyano-2,4-dinitrobenzene and an amino compound corresponding to the general formula

wherein A represents a nucleus of the benzene series which carries a methyl group in meta position to the

group, and where $R_1$ and $R_2$ represent a member of the group consisting of hydrogen and alkyl.

18. The azo dyestuffs prepared from 1-amino-6-cyano-2,4-dinitrobenzene and an amino compound corresponding to the general formula

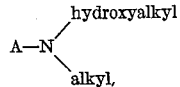

wherein A represents a nucleus of the benzene series which carries a methyl group in meta position to the

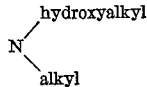

group.

19. The azo dyestuffs prepared from 1-amino-6-cyano-2,4-dinitrobenzene and an amino compound corresponding to the general formula

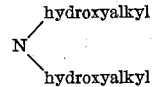

wherein A represents a nucleus of the benzene series which carries a methyl group in meta position to the

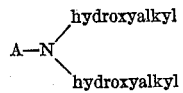

group.

20. The azo-dyestuffs of the general formula

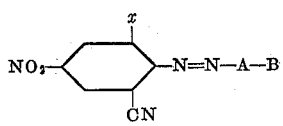

in which $x$ stands for a member of the group consisting of a hydrogen atom and a nitro-group, A for an aromatic nucleus of the benzene series which is substituted only by alkyl and alkoxy-groups, and B for an amino-group standing in the 4-position to the —N=N— group, which products are dark powders soluble in pyridine to red, violet and blue solutions and dyeing the fiber red to blue tints.

21. The unsulfonated azo-dyestuffs of the general formula

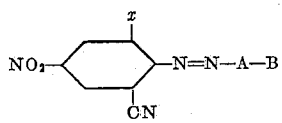

in which $x$ stands for a member of the group consisting of a hydrogen atom and a nitro-group, A for an aromatic nucleus of the benzene series which is substituted only by alkyl and alkoxy-groups, and B for an amino-group standing in the 4-position to the —N=N— group, which products are dark powders insoluble in water, but dissolving in acetic ester to red to blue solutions, and dyeing acetate artificial silk from a dye-bath containing these products in a fine dispersion red to blue tints of good fastness properties.

22. The unsulfonated azo-dyestuffs of the general formula

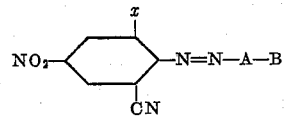

in which $x$ stands for a member of the group consisting of a hydrogen atom and a nitro-group, A for an aromatic nucleus of the benzene series which is substituted only by alkyl and alkoxy-groups, and B for an amino-group standing in the 4-position to the —N=N—group and substituted by two alkyl radicals, which products are dark powders insoluble in water, but dissolving in acetic ester to red to blue solutions, and dyeing acetate artificial silk from a dye-bath containing these products in a fine dispersion red to blue tints of good fastness properties.

23. The unsulfonated azo-dyestuffs of the general formula

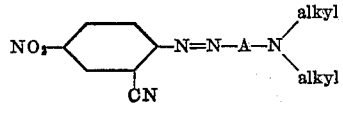

in which A stands for an aromatic nucleus of the benzene series which is substituted only by alkyl and alkoxy-groups, and the

group stands in the 4-position to the azo-group, which products are dark powders insoluble in water, but dissolving in acetic ester to red to blue solutions, and dyeing acetate artificial silk from a dye-bath containing these products in a fine dispersion red to blue tints of good fastness properties.

24. The unsulfonated azo-dyestuff of the formula

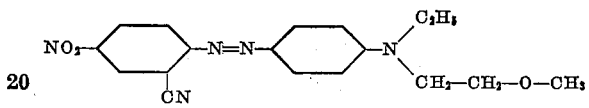

which product is a dark powder insoluble in water, but dissolving in acetic ester to a red violet solution, and dyeing acetate artificial silk from a dye-bath containing this product in a fine dispersion red violet tints of good fastness properties.

25. The unsulfonated azo-dyestuff of the formula

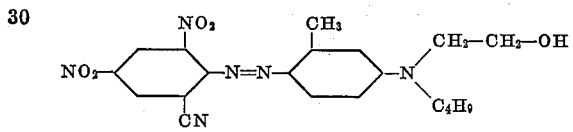

which product is a dark powder insoluble in water, but dissolving in acetic ester to a blue solution, and dyeing acetate artificial silk from a dye-bath containing this product in a fine dispersion navy blue tints of good fastness properties.

26. The azo-dyestuffs of the general formula

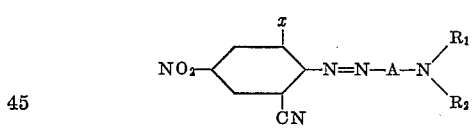

wherein $x$ represents a member of the group consisting of hydrogen and nitro, A represents an aromatic nucleus of the naphthalene series, and $R_1$ and $R_2$ represent a member of the group consisting of hydrogen and alkyl, the amino group

standing in ortho or para position to the —N=N— group.

27. The unsulfonated azo-dyestuff of the formula

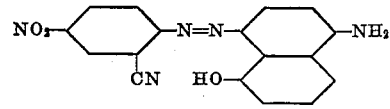

which product is a dark powder insoluble in water, but soluble in acetic ester to a blue solution and dyeing acetate artificial silk from a bath containing this dyestuff in fine suspension intensive pure blue tints.

28. The azo-dyestuffs of the general formula

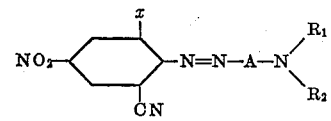

wherein $x$ represents a member of the group consisting of hydrogen and nitro, A represents a member of the group consisting of aromatic nuclei of the benzene and naphthalene series, and $R_1$ and $R_2$ represent a member of the group consisting of hydrogen and alkyl, the amino group

standing in 4-position to the —N=N— group.

29. The azo-dyestuffs of the general formula

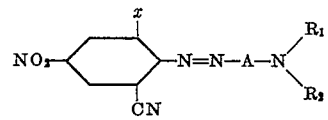

wherein $x$ represents a member of the group consisting of hydrogen and nitro, A represents an aromatic nucleus of the naphthalene series, and $R_1$ and $R_2$ represent a member of the group consisting of hydrogen and alkyl, the amino group

standing in para position to the —N=N—group.

WILHELM HUBER.